March 24, 1953  C. BELSKY  2,632,244

TOOLHOLDER

Filed Feb. 16, 1949

INVENTOR.
CHARLES BELSKY
BY
O. H. Fowler

Patented Mar. 24, 1953

2,632,244

UNITED STATES PATENT OFFICE 2,632,244

TOOLHOLDER

Charles Belsky, Detroit, Mich.

Application February 16, 1949, Serial No. 76,690

3 Claims. (Cl. 30—162)

This invention relates to an implement holder and more particularly to a holder for small instruments that may be housed in the holder and projected and/or contracted at will.

An object of the invention is to provide an implement holder having a handle, and a clip for an instrument slidable in the handle.

Another object of the invention is to provide an implement holder having a handle, and a clip for an implement slidable in the handle so as to project and/or retract the implement.

Another object of the invention is to provide an implement holder including a clip having oppositely disposed clutch faces, and grips for the clip normal to the clutch faces.

A further object of the invention is to provide a holder for an implement including a handle having a longitudinal bore and a longitudinal slot communicating with the bore, and a clip slidable in the bore and slot having opposed clutch faces and grips normal to the clutch faces and extended through and beyond the slot.

Other objects and advantages of the invention will appear from the following description when taken in connection with the drawings forming a part of this specification, and in which.

Figure 1:
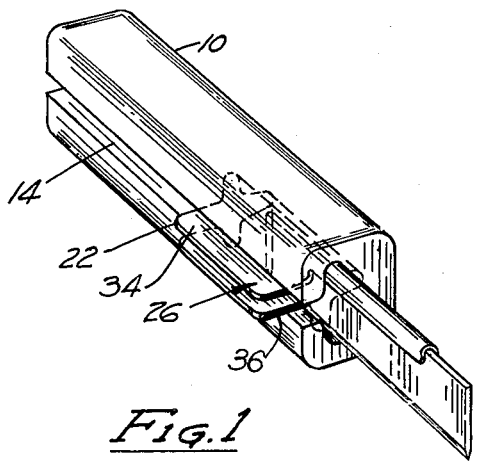
Fig. 1 is a perspective view illustrating the holder with a tool or blade therein.
Figure 2:
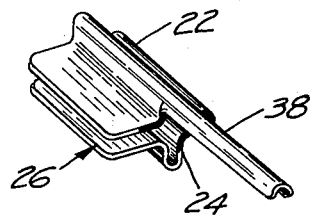
Fig. 2 is a perspective view of the clip for the tool or blade.
Figure 3:
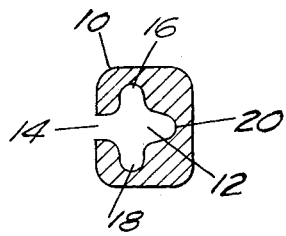
Fig. 3 is a cross sectional view of the handle.
Figure 4:
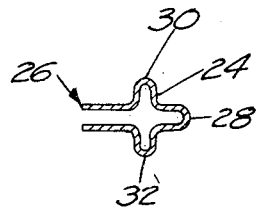
Fig. 4 is a cross sectional view of the clip for the tool or blade.
Figure 5:
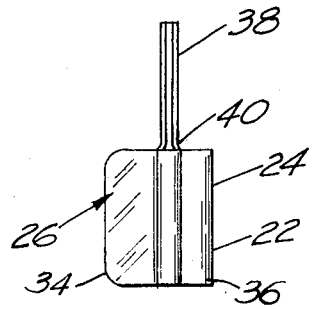
Fig. 5 is a side elevation of the clip.

Referring to the drawings for more specific details of the invention 10 represents a handle which may be of any suitable configuration. The handle has an axial bore or channel 12 extended therethrough and a longitudinal slot 14 extended through the side of the handle in direct communication with the bore throughout the length thereof. As shown, the bore has a varied diameter including corresponding oppositely disposed grooves or arcuate wall sections 16 and 18 and a relatively small groove or arcuate wall section 20 opposite the slot 14.

A clip 22 is slidable in the bore or channel 12 and slot 14. The clip has a body portion 24 complementary to the bore or channel 12 and grips indicated generally at 26 extended through and beyond the slot 14. As shown, the clip is a metallic stamping, preferably of a flexible metal, bent upon itself or deformed to provide a small arcuate section 28 adapted to fit snugly in the arcuate wall section 20 of the bore or channel 12, and further deformed to provide oppositely disposed relatively large arcuate sections constituting clutches 30 and 32 adapted to fit snugly in the arcuate wall sections 16 and 18 and two corresponding oppositely disposed grips 34 and 36 normal to the clutches and extended through and beyond the slot 14.

The clip also has a section or projection 38 extensive with the arcuate section 30 suitable to provide a backing for a flexible blade, and if desired the projection 38 may be more or less contracted as at 40 to closely fit the blade.

Figure 6:
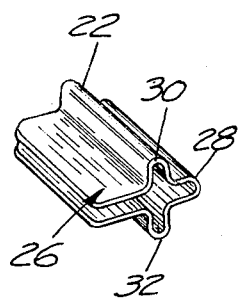
Fig. 6 is a perspective view illustrating a modification of the clip.

A modification is shown in Fig. 6 wherein the extension or projection 38 is eliminated since such structure is not necessary nor even desirable in instances where the holder is to be used for instrumentalities of a rigid structure or character.

In use a blade or any other instrument is inserted in the clip 22 and the assembly slipped in the bore and slot of the handle 10. The grips 26 of the clip 22 extend through and beyond the slot and serve as means for release of the clutches 30 and 32, for moving the instrument into and out of the handle and also as a thumb grip inhibiting twisting of the handle.

While this invention has been described in connection with certain specific embodiments, the principle involved susceptible of numerous other applications that will readily occur to persons skilled in the art. The invention is, therefore, to be limited only as indicated by the scope of the appended claims.

Having thus described the various features of the invention what I claim as new and desire to secure by Letters Patent is:

1. A blade holder comprising a member having an interior longitudinal channel extended therethrough, the channel having spaced longitudinal grooves extended the length thereof, and a slot extended from the channel to the outer surface of the member, a flexible clip for the reception of the blade said clip being slidable in the channel, oppositely disposed clutches on the clip shaped to conform to the grooves and each being received by its complementary groove, and grips integral with the clutches extending through and beyond the slot.

2. A blade holder comprising a handle having an interior longitudinal channel with spaced longitudinal grooves extended throughout the length thereof and a slot extended from the channel to the outer surface of the handle throughout the length of the channel, a flexible clip for the reception of the blade, oppositely disposed clutching members on the clip received by said grooves in the channel and grips normal to the clutching members extending through and beyond the slot.

3. A blade holder comprising a handle having an interior longitudinally grooved channel extended throughout the length thereof and a slot extended from the channel to the outer surface of the handle throughout the length thereof, a clip for the blade slidable in the channel having a body portion complementary to the channel, oppositely disposed gripping faces on the body portion arranged in a plane transversely of the clip and normally engaging complementary sections of the channel, a projection on the body portion for the reception of the back of the blade, and oppositely disposed grips on the body portion normal to the gripping faces and extended through and beyond the slot.

CHARLES BELSKY.

REFERENCES CITED

The following references are of record in the file of this patent:

UNITED STATES PATENTS

| Number | Name | Date |
|---|---|---|
| 1,465,751 | Wright | Aug. 21, 1923 |
| 2,056,717 | Flagg | Oct. 6, 1936 |
| 2,105,663 | Laverty | Jan. 18, 1938 |

FOREIGN PATENTS

| Number | Country | Date |
|---|---|---|
| 565,440 | Great Britain | Nov. 10, 1944 |